US012652720B2

(12) United States Patent (10) Patent No.: US 12,652,720 B2
Xiao et al. (45) Date of Patent: Jun. 9, 2026

(54) DATA TRANSMISSION METHOD AND USER EQUIPMENT

(71) Applicant: Sharp Kabushiki Kaisha, Sakai City (JP)

(72) Inventors: FangYing Xiao, Shanghai (CN); Renmao Liu, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 385 days.

(21) Appl. No.: 18/270,551

(22) PCT Filed: Jan. 4, 2022

(86) PCT No.: PCT/CN2022/070071
§ 371 (c)(1),
(2) Date: Jun. 30, 2023

(87) PCT Pub. No.: WO2022/148338
PCT Pub. Date: Jul. 14, 2022

(65) Prior Publication Data
US 2024/0080933 A1 Mar. 7, 2024

(30) Foreign Application Priority Data

Jan. 5, 2021 (CN) .......................... 202110010445.8

(51) Int. Cl.
*H04W 76/27* (2018.01)
(52) U.S. Cl.
CPC .................................. *H04W 76/27* (2018.02)
(58) Field of Classification Search
CPC ..... H04W 60/02; H04W 76/10; H04W 76/19; H04W 76/27; H04L 5/0053

USPC ........................................................ 455/422.1
See application file for complete search history.

(56) References Cited

U.S. PATENT DOCUMENTS

| | | | |
|---|---|---|---|
| 11,665,772 B2 * | 5/2023 | Lin ................... | H04W 28/0231 |
| | | | 370/329 |
| 2020/0015074 A1 * | 1/2020 | Kim ..................... | H04W 12/108 |
| 2020/0344629 A1 * | 10/2020 | Kim ................... | H04W 52/0209 |
| 2020/0404729 A1 * | 12/2020 | Mildh ................. | H04W 68/005 |
| 2021/0329511 A1 * | 10/2021 | Chen ..................... | H04W 76/30 |
| 2022/0022276 A1 * | 1/2022 | Shih ..................... | H04L 5/0094 |

(Continued)

OTHER PUBLICATIONS

Official Communication issued in International Patent Application No. PCT/CN2022/070071, mailed on Mar. 31, 2022.

(Continued)

*Primary Examiner* — Jean A Gelin
(74) *Attorney, Agent, or Firm* — Keating & Bennett, LLP

(57) ABSTRACT
A data transmission method, wherein when small data arrives, user equipment (UE) in a radio resource control inactive state RRC_INACTIVE can establish a communication with a base station without entering an RRC connected state, so as to perform small data transmission (SDT). An RNAU timer for controlling a periodic radio access network (RAN) based notification area update is set for the base station. For the SDT, an SDT timer for SDT small data transmission is set. A small data transmission data radio bearer (DRB) is configured for the user equipment. When an RRC resume procedure is triggered by arrival of data at the DRB, a high layer triggering small data transmission, or the like, the user equipment starts the SDT timer.

2 Claims, 5 Drawing Sheets

When an SDT timer is running, and an indication from a lower layer is received — S101

T380 is running — S102

Restart T380 — S103

(56) References Cited

U.S. PATENT DOCUMENTS

| | | | |
|---|---|---|---|
| 2022/0078875 A1* | 3/2022 | Ou | H04W 76/25 |
| 2022/0210632 A1* | 6/2022 | Tseng | H04W 8/183 |
| 2024/0098547 A1* | 3/2024 | Kim | H04W 24/10 |
| 2024/0179787 A1* | 5/2024 | Park | H04W 72/231 |
| 2024/0314873 A1* | 9/2024 | Palat | H04W 76/19 |
| 2024/0334494 A1* | 10/2024 | Fujishiro | H04W 74/0833 |

OTHER PUBLICATIONS

"3rd Generation Partnership Project; Technical Specification Group Radio Access Network; NR: Medium Access Control (MAC) protocol specification (Release 16)", 3GPP TS 38.321 V16.2.1, Sep. 2020, pp. 1-154.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.2.1, Sep. 2020, pp. 1-1081.

"3rd Generation Partnership Project; Technical Specification Group Radio Access Network; Evolved Universal Terrestrial Radio Access (E-UTRA) and Evolved Universal Terrestrial Radio Access Network E-UTRAN); Overall description; Stage 2 (Release 16)", 3GPP TS 36.300 V16.3.0, Sep. 2020, pp. 1-390.

"3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.

"3rd Generation Partnership Project; Technical Specification Group Radio Access Network; NR; NR and NG-RAN Overall Description; Stage 2 (Release 16)", 3GPP TS 38.300 V16.3.0, Sep. 2020, pp. 1-148.

ZTE Corporation, "Work Item on NR smalldata transmissions in Inactive state", 3GPP TSG RAN Meeting #88e, RP-201305, Jun. 29-Jul. 3, 2020, 5 pages.

Etri, "Timer configuration for SDT failure detection", 3GPP TSG-RAN WG2 #112-e, R2-2009344, Nov. 2-13, 2020, 2 pages.

Interdigital, "Small data transmission failure and cell reselection", 3GPP RAN WG2 Meeting #112e, R2-2010109, Nov. 2-13, 2020, pp. 1-4.

Huawei et al., "SDT aspects common for RACH-based and CG-based SDT scheme", 3GPP TSG-RAN WG2 #112-e, R2-2009930, Nov. 2-13, 2020, pp. 1-17.

* cited by examiner

When an SDT timer is running, and
if the RRC resume procedure is not
triggered by an RNAU or is not
triggered due to expiration of T380

S201

Initiate an RRC resume procedure

S202

A base station has configured, for
UE, a configured uplink grant for
SDT                                    S301

Skip starting T380                     S302

When a timer T319 is running, and
an indication from a lower layer is
received, and if T380 is running

S401

Restart T380

S402

UE 500

DATA TRANSMISSION METHOD AND USER EQUIPMENT

TECHNICAL FIELD

The present invention relates to the technical field of wireless communication. More specifically, the present invention relates to a data transmission method and user equipment.

BACKGROUND

In existing systems, user equipment in a radio resource control inactive state RRC_INACTIVE cannot perform uplink data transmission or downlink data reception. Even if the user equipment in RRC_INACTIVE needs to transmit a small amount of data, e.g., traffic from Instant Messaging (IM) services, heart-beat/keep-alive traffic from IM/email clients and other Apps, traffic from wearable apparatuses, etc., the user equipment needs to establish an RRC connection with a base station, and enter RRC_INACTIVE again after data transmission on the basis of an indication from the base station. This results in unnecessary energy consumption and signaling overhead.

On the basis of the above reason, in Release 17, ZTE proposed a work item for small data transmission of RRC_I-NACTIVE (see 3GPP Proposal RP-201305), and the proposal was approved.

Currently, 3GPP presents two small data transmission schemes for the work item. One of the schemes is random access-based small data transmission. On the basis of this scheme, when small data arrives, user equipment transmits an RRC resume request message RRCResumeRequest. Upon reception of this message, the base station does not respond immediately to an RRC message, e.g., RRCResume or RRCSetup, that causes the UE to enter an RRC connection immediately, but assigns an uplink grant to the UE, so that the UE can use the uplink grant to transmit small data. After data transmission is completed, the base station may transmit to the UE an RRC message RRCRelease for releasing the current RRC connection, so that the UE enters an RRC idle state RRC_IDLE or RRC_INACTIVE. The other scheme is configured uplink grant based small data transmission. On the basis of this scheme, a base station assigns UE a Configured uplink Grant (CG) for small data transmission when releasing the UE to enter RRC_INAC-TIVE. When small data arrives, the UE in RRC_INACTIVE directly uses the CG to perform small data transmission, without performing state switching.

On the basis of the above two schemes, when small data arrives, UE can establish a communication with a base station without entering an RRC connected state, so as to transmit small data. If a timer T380 for controlling a radio access network (RAN) based notification area (RNA) update expires when the UE and the base station perform small data transmission, an RNA-based notification area update (RNAU) procedure is triggered, so that the UE informs the base station that the UE is in an RNA corresponding to the current base station. However, this objective has been achieved when the UE and the base station perform small data transmission. During small data transmission, if an RNAU is triggered due to expiration of T380, and an RRC resume procedure is performed, the small data transmission is interrupted, and unnecessary signaling overhead is caused. The present invention will address this problem.

SUMMARY

An objective of the present invention is to provide a data transmission method enabling user equipment in a radio resource control inactive state RRC_INACTIVE to establish a communication with a base station without entering an RRC connected state, so as to transmit small data, and user equipment.

According to a data transmission method of the present invention, when small data arrives, user equipment (UE) in a radio resource control inactive state RRC_INACTIVE can establish a communication with a base station without entering an RRC connected state, so as to perform small data transmission (SDT), an RNAU timer for controlling a periodic radio access network (RAN) based notification area update being set for the base station, for the SDT, an SDT timer for SDT small data transmission being set, a small data transmission data radio bearer (DRB) being configured for the user equipment, and when an RRC resume procedure is triggered by arrival of data at the DRB, a high layer triggering small data transmission, or the like, the user equipment starting the SDT timer.

On the basis of the above data transmission method, when the SDT timer is running and an indication from a lower layer is received, and if the RNAU timer is running, the RNAU timer is restarted.

On the basis of the above data transmission method, when the SDT timer is running, and if the RNAU timer is running when an indication from a lower layer is received, the RNAU timer is stopped.

On the basis of the above data transmission method, the indication from the lower layer is a random access success indication from a Medium Access Control (MAC) layer, or indicates reception of an acknowledgment for the SDT, or reception of an acknowledgment for an SDT request, or reception of a downlink assignment, or reception of an uplink grant, or performing of uplink transmission.

On the basis of the above data transmission method, at the MAC layer, in an SDT procedure, if a physical downlink control channel (PDCCH) addressed to a MAC entity user equipment identifier C-RNTI or CS-RNTI is received, an indication is transmitted to an upper layer, or reception of a downlink assignment or an uplink grant is indicated to the upper layer.

On the basis of the above data transmission method, when the SDT timer is running, and if the RRC resume procedure is not triggered by a RAN-based notification area update (RNAU) or is not triggered due to expiration of the RNAU timer, the RRC resume procedure is initiated.

On the basis of the above data transmission method, if the RRC resume procedure is not triggered due to an occurrence of an RNAU or the expiration of the RNAU timer when the SDT timer is running or the user equipment is performing an SDT procedure, the user equipment initiates the RRC resume procedure.

On the basis of the above data transmission method, if the base station has configured, for the for the user equipment, a configured uplink grant for the SDT, the RNAU timer is not started.

On the basis of the above data transmission method, if the base station has not configured, for the user equipment, a configured uplink grant for the SDT, or an RRCRelease message does not comprise a configured uplink grant or does not comprise a configured uplink grant for the SDT, the RNAU timer is started.

User equipment of the present invention comprises: a processor; and a memory storing instructions, wherein the instructions, when run by the processor, perform the method according to any one of claims 1 to 9.

Effect of Invention

The data transmission method of the present invention enables user equipment in a radio resource control inactive state RRC_INACTIVE to establish a communication with a base station without entering an RRC connected state, so as to transmit small data, thereby reducing unnecessary energy consumption and signaling overhead.

BRIEF DESCRIPTION OF THE DRAWINGS

The above and other features of the present invention will be more apparent from the following detailed description in combination with the accompanying drawings, in which.

DETAILED DESCRIPTION

Figure 1:
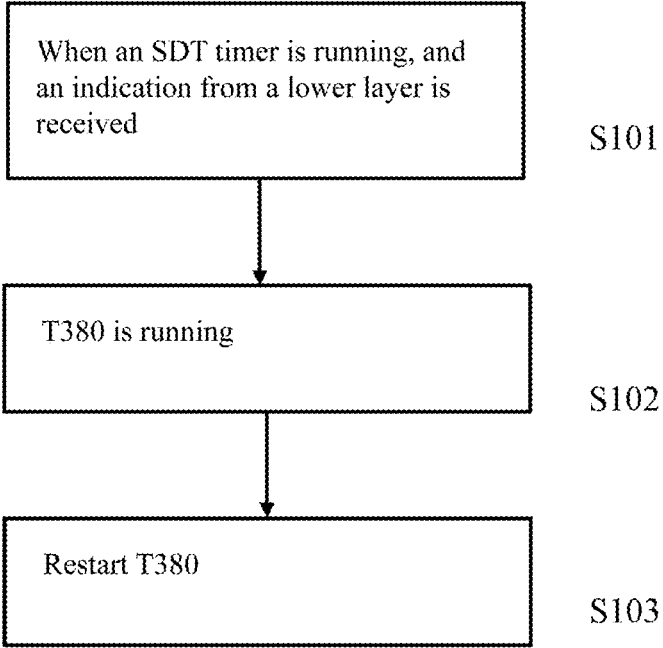
FIG. 1 is a diagram showing a data transmission method according to Embodiment 1 of the present invention.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention. In the present invention, embodiments are described by using small data transmission as examples. However, it should be noted that the embodiments of the present invention are not limited to application scenarios of small data transmission, and can also be used in other application scenarios.

The following describes some terms involved in the present invention. For the specific meanings of the terms, please see the latest 3GPP related documents, for example TS38.300, TS38.331, TS36.300, TS36.331, etc.

NAS: Non-Access Stratum.

AS: Access Stratum.

DRB: Data Radio Bearer.

RRC: Radio Resource Control.

RRC_CONNECTED: RRC connected state.

RRC_INACTIVE: RRC inactive state.

RRC_IDLE: RRC idle state.

RAN: Radio Access Network.

RNAU: RAN-based Notification Area Update.

NR: New RAT, New Radio Access Technology.

PDCCH: Physical Downlink Control Channel.

SDT: Small Data Transmission.

Msg3: a message transmitted on a UL-SCH containing a C-RNTI MAC CE or CCCH SDU, submitted from upper layer and associated with the UE Contention Resolution Identity, as part of a random access procedure.

MAC CE: Medium Access Control Control Element.

SDU: Service Data Unit.

PDU: Protocol Data Unit.

C-RNTI: Cell RNTI, unique UE identification used as an identifier of the RRC connection and for scheduling.

CS-RNTI: unique UE identification used for configured grant in the uplink.

One random access response MAC PDU includes one or more MAC subPDUs. Each MAC subPDU includes one of the following subheaders: a MAC subheader with a backoff indicator only, a MAC subheader with a RAPID only, a MAC subheader with a RAPID, and a MAC RAR. One MSGB or MSGB MAC PDU includes one or more MAC subPDUs. Each MAC subPDU includes one of the following subheaders: a MAC subheader with a backoff indicator only, a MAC subheader and fallbackRAR, a MAC subheader and successRAR, a MAC subheader and a MAC SDU for a CCCH or a DCCH, a MAC subheader, and padding. The successRAR includes the UE Contention Resolution Identity (this field includes an uplink UL CCCH SDU or the first 48 bits thereof), etc. For detailed description of the MAC PDU and the MAC subPDU, please see the latest version of TS38.321.

T380 may be referred to as an RNAU timer, and is for controlling a periodic RAN-based notification area update. When a base station releases an RRC connection of UE and instructs the UE to enter RRC_INACTIVE, an RRCRelease message for achieving this purpose may carry one field t380 for indicating the value of the timer that triggers a periodic RNAU procedure. The UE starts T380 upon reception of the RRCRelease message including the t380 field. The UE stops T380 upon reception of an RRCResume, RRCSetup, or RRCRelease message. When T380 expires, the UE in RRC_INACTIVE is triggered to perform an RNA update (RNAU) procedure.

The timer T319 is started upon transmission of RRCResumeRequest or RRCResumeRequest1, and is stopped upon reception of RRCResume, RRCSetup, RRCRelease, or an RRCRelease message with the information element suspendConfig, or reception of an RRCReject message (Upon reception of RRCResume, RRCSetup, RRCRelease, RRCRelease with suspendConfig or RRCReject message, cell re-selection and upon abortion of connection establishment by upper layers).

In the present disclosure, RRCResumeRequest or RRCResumeRequest1 is used to request resumption of a suspended RRC connection or performing of an RNA update. The information element suspendConfig is used to indicate configuration for the RRC_INACTIVE state. The RRCResume message is used to resume a suspended RRC connection. The RRCSetup message is used to set up a signaling radio bearer SRB1. The RRCRelease message is used to command the release of an RRC connection or the suspension of the RRC connection. The RRCReject message is used to reject an RRC connection establishment or an RRC connection resumption.

It was concluded at the RAN2_112e meeting that a new timer is defined for the SDT, and is denoted as the SDT timer. When the UE is configured with small data transmission DRB, and when an RRC resume procedure is triggered by arrival of data at the DRB, a high layer triggering small data transmission, or the like, the UE starts the SDT timer, and then starts a procedure of transmitting an RRCResumeRequest message or an RRCResumeRequest1 message or of transmitting another RRC message used to indicate that the UE needs to perform the SDT. The SDT timer may be restarted or stopped upon reception of a downlink assignment or an uplink grant (or indication of reception of a downlink assignment or an uplink grant from a lower layer). Alternatively, the SDT timer is stopped upon reception of a response message from the base station. It should be noted that the order of the UE starting the SDT timer and the UE starting the procedure of transmitting the RRCResumeRequest message or the RRCResumeRequest1 message or transmitting another RRC message for indicating the UE needs to perform the SDT may be interchanged. That is, the procedure of transmitting the RRCResumeRequest message or the RRCResumeRequest1 message or transmitting another RRC message for indicating that the UE needs to perform the SDT is started, and then the SDT timer is started or restarted. Preferably, the received downlink assignment or uplink grant is reception of a PDCCH addressed to a MAC entity C-RNTI or CS-RNTI (or reception of the downlink assignment or the uplink grant indicated in the PDCCH addressed to the MAC entity C-RNTI or CS-RNTI).

Data radio bearers (DRBs) that can perform small data transmission are configured by the base station. For example, the base station includes an indicator in an RRC message (e.g., RRCRelease) to indicate whether a corresponding DRB can perform small data transmission. If the base station configures the indicator for a certain DRB of the UE via an RRC message, it is indicated that this DRB can perform small data transmission. For a DRB configured with small data transmission, it is indicated that the user equipment can perform a data transmission procedure without entering the RRC connected state.

The following briefly describes the random access procedure in an existing 5G/NR system first. Please see 3GPP document TS38.321 for the detailed procedure:

First, UE selects a random access resource according to a random access type (a 2-step random access 2-stepRA or a 4-step random access 4-stepRA), including an SSB and/or a preamble. For the 2-step random access, a PUSCH occasion for transmitting the MSGA further needs to be selected. Then, Msg1 is transmitted. Msg1 is used by the UE to transmit a preamble to the network (i.e., the base station). For the 2-step random access, Msg1 further includes transmitting MSGA (or content in an MSGA buffer). In other words, in the 2-step random access, Msg1 transmission (or MSGA transmission) includes the transmission of the PRACH preamble as well as the contents of the MSGA buffer in the PUSCH resource corresponding to the selected PRACH occasion and PREAMBLE_INDEX. After the UE transmits Msg1 (or the random access preamble), ra-ResponseWindow is initiated, or msgB-ResponseWindow is initiated (for the 2-step random access 2-stepRA). During running of ra-ResponseWindow or msgB-ResponseWindow, the PDCCH is monitored to receive Msg2. Msg2 is referred to as a random access response, and for the 2-step random access, Msg2 may also be referred to as an MCGB. For a contention-free random access procedure, the random access procedure ends when the UE successfully receives Msg2 (i.e., successfully receiving the random access response). For the contention-based 4-step random access procedure, if the UE acquires the uplink (UL) grant in Msg2, Msg3 is transmitted on the uplink grant. After Msg3 is transmitted, ra-ContentionResolutionTimer is started. During running of ra-ContentionResolutionTimer, the PDCCH is monitored to receive Msg4 for contention resolution.

It should be noted that ra-ResponseWindow is the time window to monitor RA response(s), and msgB-Response-Window is the time window to monitor RA response(s) for 2-step RA type. ra-ContentionResolutionTimer is the contention resolution timer. For specific times of starting these several timers, please see the description in TS38.321.

According to a data transmission method of the present invention, when small data arrives, user equipment in a radio resource control inactive state RRC_INACTIVE can establish a communication with a base station without entering an RRC connected state, so as to perform small data transmission (SDT). An RNAU timer, i.e., T380, for controlling a periodic RAN-based notification area update is set for the base station. For the SDT, an SDT timer for SDT small data transmission is set. A small data transmission data radio bearer (DRB) is configured for the user equipment. When an RRC resume procedure is triggered by arrival of data at the DRB, a high layer triggering small data transmission, or the like, the user equipment starts the SDT timer.

Embodiments of the present invention will be described in detail below.

Embodiment 1

Embodiment 1 of the present invention will be described below by using FIG. 1. FIG. 1 is a diagram showing a data transmission method according to Embodiment 1 of the present invention.

When an SDT timer is running, and an indication from a lower layer is received (S101), and if T380 is running (S102), T380 is restarted (S103).

Specifically, at the RRC layer, when the SDT timer is running, and if the indication from the lower layer is received, T380 is restarted (in the case that T380 is running) Preferably, the indication from the lower layer is reception of a downlink assignment or reception of an uplink grant or performing of uplink transmission. Alternatively, the indication from the lower layer is a random access success indication from the MAC layer, or reception of an acknowledgment for SDT, or reception of an acknowledgment for an SDT request.

Optionally, at the MAC layer, in an SDT procedure, if a PDCCH addressed to a MAC entity C-RNTI or CS-RNTI is received, and the PDCCH can be used for the downlink assignment or the uplink grant, an indication is transmitted to an upper layer, or reception of a downlink assignment or an uplink grant is indicated to the upper layer.

Optionally, at the MAC layer, in an SDT procedure, if UE has transmitted a MAC PDU on a configured uplink grant for the SDT (for example, when a HARQ entity acquires the MAC PDU for the configured uplink grant or a HARQ process instructs the physical layer to generate a transmission according to a stored uplink grant, an indication is transmitted to the upper layer), an indication is transmitted to the upper layer, or performing of uplink transmission is indicated to the upper layer.

Optionally, at the MAC layer, if random access is initiated for the SDT or an employed random access resource is configured for the SDT, for example, if a preamble transmitted in a random access message 1 is configured for the SDT or a random access PRACH resource for transmitting the preamble is configured for the SDT, then after random access is successfully completed, an indication is transmitted to the upper layer or successful completion of the random access is indicated to the upper layer, or the reception of an acknowledgment for the SDT is indicated to the upper layer, or the reception of an acknowledgment for an SDT request is indicated to the upper layer. It should be noted that for 2-step random access (2-step RA type), if a received MSGB includes a successRAR MAC subPDU and a transmitted MSGA includes a CCCH SDU and a UE contention resolution identity included in a MAC subPDU matches or is identical to the CCCH SDU, it is considered that the random access is successfully completed. For 4-step random access (4-step RA type), if a CCCH SDU is included in Msg3 and the received PDCCH is addressed to TEMPO-RARY_C-RNTI, if the MAC PDU is successfully decoded (that is, if a MAC PDU received in Msg4 or a contention resolution message is successfully decoded), and the MAC PDU includes a UE contention resolution identity MAC CE and the UE contention resolution identity included in the MAC CE matches or is identical to the CCCH SDU transmitted in Msg3, it is considered that the random access is successfully completed.

Variant Embodiment of Embodiment 1

The operation of restarting T380 in Embodiment 1 is replaced with the operation of stopping T380, and the other operations remain unchanged, so that a new embodiment can be achieved.

Embodiment 2

Figure 2:
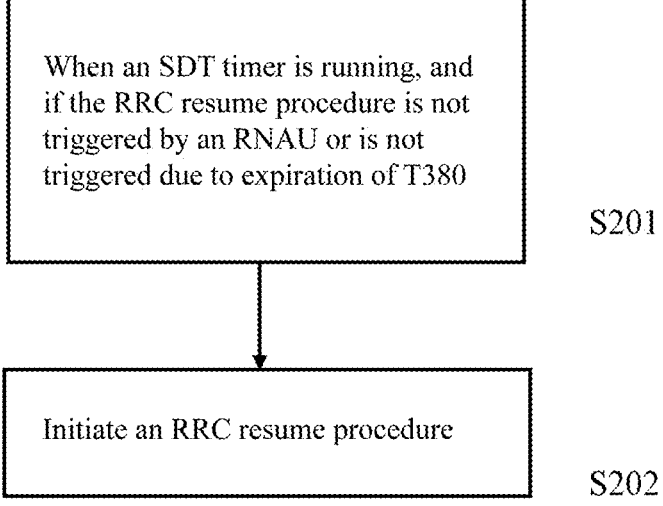
FIG. 2 is a diagram showing a data transmission method according to Embodiment 2 of the present invention.

Embodiment 2 of the present invention will be described below by using FIG. 2. FIG. 2 is a diagram showing a data transmission method according to Embodiment 2 of the present invention.

When an SDT timer is running, if an RRC resume procedure is not triggered by an RNAU or is not triggered due to expiration of T380 (S201), the RRC resume procedure is initiated (S202).

Specifically, if the RRC resume procedure is triggered due to an occurrence of an RNAU or the expiration of T380 but the SDT timer is not running or the UE is not performing an SDT procedure, the UE initiates the RRC resume procedure. In other words, if an RNAU occurs or T380 expires when the SDT timer is running or the UE is performing an SDT procedure, the UE does not perform the RRC resume procedure. In other words, when the SDT timer is running or the UE is performing the SDT procedure, if an RRC resume procedure is not triggered due to the occurrence of an RNAU or the expiration of T380, the UE performs the RRC resume procedure.

Embodiment 3

Figure 3:
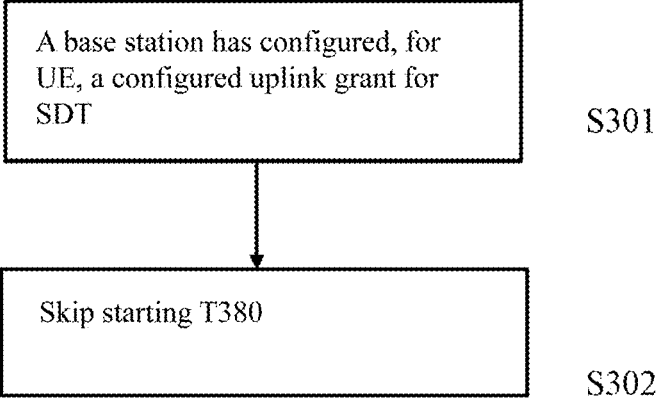
FIG. 3 is a diagram showing a data transmission method according to Embodiment 3 of the present invention.

Embodiment 3 of the present invention will be described below by using FIG. 3. FIG. 3 is a diagram showing a data transmission method according to Embodiment 3 of the present invention.

If a base station has configured, for UE, a configured uplink grant for SDT (for example, included in an RRCRelease message) (S301), T380 is not started (S302).

Specifically, if the base station has not configured, for UE, a configured uplink grant for the SDT (the configured uplink grant may be included in an RRCRelease message), or the RRCRelease message does not include a configured uplink grant or does not include a configured uplink grant for the SDT, T380 is started. Preferably, when an uplink synchronization timer expires, T380 is started. Alternatively, in the case that the RRCRelease message includes a t380 field, T380 is started only when the uplink synchronization timer expires.

Embodiment 4

Figure 4:
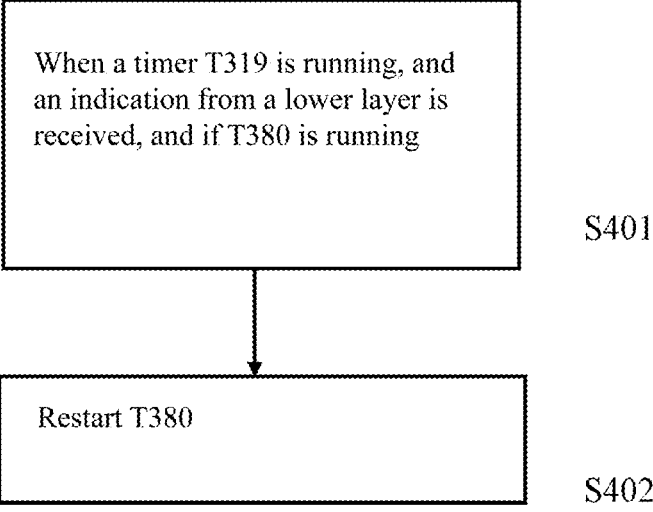
FIG. 4 is a diagram showing a data transmission method according to Embodiment 4 of the present invention.

Embodiment 4 of the present invention will be described below by using FIG. 4. FIG. 4 is a diagram showing a data transmission method according to Embodiment 4 of the present invention.

When a timer T319 is running, and an indication from a lower layer is received, and if T380 is running (S401), T380 is restarted (S402).

Specifically, at the RRC layer, when the timer T319 is running, if the indication from the lower layer is received, T380 is restarted (in the case that T380 is running) Preferably, the indication from the lower layer is reception of a downlink assignment or reception of an uplink grant or performing of uplink transmission. Alternatively, the indication from the lower layer is a random access success indication from a MAC layer, or indicates reception of an acknowledgment for the SDT, or reception of an acknowledgment for an SDT request, or reception of a downlink assignment, or reception of an uplink grant, or performing of uplink transmission.

Optionally, at the MAC layer, in an SDT procedure, if a PDCCH addressed to a MAC entity C-RNTI or CS-RNTI is received, and the PDCCH can be used for the downlink assignment or the uplink grant, an indication is transmitted to an upper layer, or reception of a downlink assignment or an uplink grant is indicated to the upper layer.

Optionally, at the MAC layer, in an SDT procedure, if UE has transmitted a MAC PDU on a configured uplink grant for the SDT (for example, when a HARQ entity acquires the MAC PDU for the configured uplink grant or a HARQ process instructs the physical layer to generate a transmission according to a stored uplink grant, an indication is transmitted to the upper layer), an indication is transmitted to the upper layer, or performing of uplink transmission is indicated to the upper layer.

Optionally, at the MAC layer, if random access is initiated for the SDT or an employed random access resource is configured for the SDT, for example, if a preamble transmitted in a random access message 1 is configured for the SDT or a random access PRACH resource for transmitting the preamble is configured for the SDT, then after random access is successfully completed, an indication is transmitted to the upper layer or successful completion of the random access is indicated to the upper layer, or the reception of an acknowledgment for the SDT is indicated to the upper layer, or the reception of an acknowledgment for an SDT request is indicated to the upper layer. It should be noted that for 2-step random access (2-step RA type), if a received MSGB includes a successRAR MAC subPDU and a transmitted MSGA includes a CCCH SDU and a UE contention resolution identity included in a MAC subPDU matches or is identical to the CCCH SDU, it is considered that the random access is successfully completed. For 4-step random access (4-step RA type), if a CCCH SDU is included in Msg3 and the received PDCCH is addressed to TEMPORARY_C-RNTI, if the MAC PDU is successfully decoded (that is, if a MAC PDU received in Msg4 or a contention resolution message is successfully decoded), and the MAC PDU includes a UE contention resolution identity MAC CE and the UE contention resolution identity included in the MAC CE matches or is identical to the CCCH SDU transmitted in Msg3, it is considered that the random access is successfully completed.

Variant Embodiment of Embodiment 4

The operation of restarting T380 in Embodiment 4 is replaced with the operation of stopping T380, and the other operations remain unchanged, so that a new embodiment can be achieved.

The following describes operations performed by the RRC layer of user equipment upon indication from the radio link control (RLC) layer that the maximum number of retransmission has been reached.

During running of the SDT timer, upon indication from the RLC layer that the maximum number of retransmission has been reached, at least one of the following operations is performed:

Operation 1: suspending DRB transmission for small data transmission or suspending resumed DRB transmission or suspending all DRB transmission.

Operation 2: stopping an SDT timer.

Operation 3: resetting a MAC layer.

Operation 4: performing related operations of entering RRC_IDLE and entering RRC_IDLE.

It should be noted that if multiple operations in operations 1-4 are performed, new embodiments achieved by changing the order of performing the operations also fall within the scope of protection of the present invention.

Figure 5:
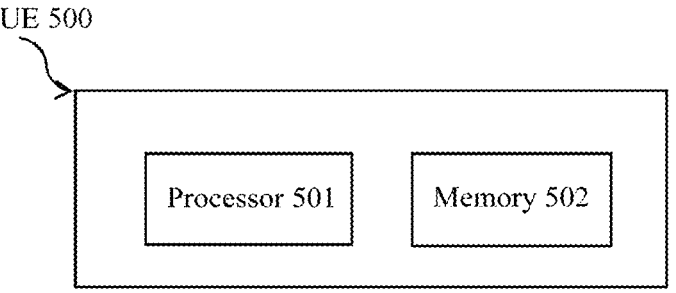
FIG. 5 is a schematic structural block diagram of user equipment (UE) according to the present invention.

User equipment of the present invention will be described below by using FIG. 5. FIG. 5 is a schematic structural block diagram of user equipment (UE) according to the present invention. As shown in FIG. 5, user equipment (UE) 500 includes a processor 501 and a memory 502. The processor 501 may include, for example, a microprocessor, a micro-controller, an embedded processor, and the like. The memory 502 may include, for example, a volatile memory (such as a random access memory (RAM)), a hard disk drive (HDD), a non-volatile memory (such as a flash memory), or other memories. The memory 502 stores program instructions. The instructions, when run by the processor 501, can implement the above method performed by user equipment as described in detail in the present invention. Additionally, the computer-executable instructions or program running on the device according to the present disclosure may be a program that enables the computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

Additionally, the computer-executable instructions or program running on the device according to the present invention may be a program that enables the computer to implement the functions of the embodiments of the present invention by controlling the central processing unit (CPU). The program or information processed by the program may be temporarily stored in a volatile memory (for example, a random access memory (RAM)), a hard disk drive (HDD), a non-volatile memory (for example, a flash memory), or other memory systems.

The computer-executable instructions or program for implementing the functions of the embodiments of the present invention may be recorded on a computer-readable storage medium. The corresponding functions may be achieved by reading programs recorded on the recording medium and executing them by the computer system. The phrase "computer system" herein may be a computer system embedded in the device, which may include operating systems or hardware (e.g., peripherals). The "computer-readable storage medium" may be a semiconductor recording medium, an optical recording medium, a magnetic recording medium, a short-time dynamic memory program recording medium, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A method performed by a user equipment (UE), the method comprising:

initiating a Radio Resource Control (RRC) resume procedure, wherein, based on a determination that a first timer expires but a second timer is not running, the RRC resume procedure is initiated for RAN-based Notification Area update (RNAU);

transmitting an RRCResumeRequest message or an RRCResumeRequest1 message when the RRC resume procedure is initiated;

starting the second timer after the RRC resume procedure is initiated; and causing an RRC layer of the UE to perform operations of entering RRC_IDLE based on a determination, during running of the second timer, that the RRC layer receives an indication from a radio link control (RLC) layer that the maximum number of retransmissions has been reached, wherein the first timer is a timer T380 that triggers a periodic RNAU procedure, and the second timer is a timer defined for small data transmission (SDT) which starts upon transmission of the RRCResumeRequest message or the RRCResumeRequest1 message when the RRC resume procedure is initiated for the SDT.

2. A user equipment (UE), comprising:

a processor; and a memory storing instructions, wherein the processor is configured by the instructions to cause the UE to:

initiate a Radio Resource Control (RRC) resume procedure, wherein, based on a determination that a first timer expires but a second timer is not running, the RRC resume procedure is initiated for RAN-based Notification Area update (RNAU);

transmit an RRCResumeRequest message or an RRCResumeRequest1 message when the RRC resume procedure is initiated;

start the second timer after the RRC resume procedure is initiated; and cause an RRC layer of the UE to perform operations of entering RRC_IDLE based on a determination, during running of the second timer, that the RRC layer receives an indication from a radio link control (RLC) layer that the maximum number of retransmissions has been reached, the first timer is a timer T380 that triggers a periodic RNAU procedure, and the second timer is a timer defined for small data transmission (SDT) which starts upon transmission of the RRCResumeRequest message or the RRCResumeRequest1 message when the RRC resume procedure is initiated for the SDT.

* * * * *